US007006844B2

(12) United States Patent
Sarkkinen et al.

(10) Patent No.: US 7,006,844 B2
(45) Date of Patent: Feb. 28, 2006

(54) ADAPTIVE POWER CONTROL FOR MULTICAST TRANSMISSION

(75) Inventors: Sinikka Sarkkinen, Kangasala (FI); Jari Isokangas, Tampere (FI); Dimitris Koulakiotis, London (GB)

(73) Assignee: Nokia Corporation, Espoo (FI)

( * ) Notice: Subject to any disclaimer, the term of this patent is extended or adjusted under 35 U.S.C. 154(b) by 194 days.

(21) Appl. No.: 10/076,617

(22) Filed: Feb. 19, 2002

(65) Prior Publication Data

US 2003/0157952 A1 Aug. 21, 2003

(51) Int. Cl.
*H04B 7/00* (2006.01)

(52) U.S. Cl. ......................... 455/522; 455/69; 455/521

(58) Field of Classification Search ................ 455/522, 455/69, 517, 518, 519, 520, 521, 503, 127.1, 455/442, 436; 370/312, 335, 252; 375/144, 375/347

See application file for complete search history.

(56) References Cited

U.S. PATENT DOCUMENTS

| | | | | |
|---|---|---|---|---|
| 5,056,109 | A | 10/1991 | Gilhousen et al. | |
| 5,881,368 | A * | 3/1999 | Grob et al. | 455/69 |
| 6,085,108 | A | 7/2000 | Knutsson et al. | |
| 6,292,471 | B1 * | 9/2001 | Cao et al. | 370/252 |
| 6,311,070 | B1 | 10/2001 | Tong et al. | |
| 6,374,085 | B1 * | 4/2002 | Saints et al. | 455/69 |
| 6,389,265 | B1 | 5/2002 | Jeschke et al. | |
| 6,400,960 | B1 * | 6/2002 | Dominique et al. | 455/522 |
| 6,556,838 | B1 | 4/2003 | Baker et al. | |
| 6,650,905 | B1 * | 11/2003 | Toskala et al. | 455/522 |
| 6,728,292 | B1 * | 4/2004 | Zeira et al. | 375/130 |
| 6,819,937 | B1 * | 11/2004 | Knuutila et al. | 455/522 |
| 6,909,880 | B1 * | 6/2005 | Kojima et al. | 455/522 |
| 2001/0046877 | A1 * | 11/2001 | Ohkubo et al. | 455/522 |
| 2002/0071480 | A1 * | 6/2002 | Marjelund et al. | 375/141 |
| 2003/0100269 | A1 * | 5/2003 | Lehtinen et al. | 455/69 |

FOREIGN PATENT DOCUMENTS

EP 1063782 * 12/2000

* cited by examiner

*Primary Examiner*—Tilahun Gesesse
(74) *Attorney, Agent, or Firm*—Robert M. Bauer, Esq.; Lackenbach Siegel LLP

(57) ABSTRACT

The power level of multicast data transmissions in a wireless communications network are controlled. Power level information is provided in a transmitted channel received by a user equipment. The user equipment measures the power level of a received signal. It compares the measured power level to the power level indicated by the power level information provided in the transmitted channel. Power level measurement information is included in a message sent by the user equipment depending on the results obtained when the power level measured by the user equipment is compared to the power level indicated by the power level information provided in the transmitted channel.

29 Claims, 6 Drawing Sheets

| Group id | UE id | Power inf | Location inf |
|---|---|---|---|
| Xxx | Xx1 | +11 | 1 |
| yyy | X11 | -4 | 1 |
| zzz | X21 | -3 | 2 |
| yyy | X33 | +3 | 2 |
| yyy | X75 | +2 | 4 |
| xxx | X45 | -35 | 1 |
| yyy | X34 | 000 | 2 |

| Information Element/Group name | Need | Multi | Type and reference | Semantics description |
|---|---|---|---|---|
| Message Type | MP | | Message Type | |
| **UE information elements** | | | | |
| U-RNTI | MP | | U-RNTI 10.3.3.47 | |
| RRC transaction identifier | CV-*Failure* | | RRC transaction identifier 10.3.3.36 | |
| Integrity check info | CH | | Integrity check info 10.3.3.16 | |
| START list | MP | 1 to <maxCNdomains> | | START [40] values for all CN domains. |
| >CN domain identity | MP | | CN domain identity 10.3.1.1 | |
| >START | MP | | START 10.3.3.38 | START value to be used in this CN domain. |
| AM_RLC error indication(RB2, RB3 or RB4) | MP | | Boolean | TRUE indicates AM_RLC unrecoverable error [16] occurred on RB2, RB3 or RB4 in the UE |
| AM_RLC error indication(RB>4) | MP | | Boolean | TRUE indicates AM_RLC unrecoverable error [16] occurred on RB>4 in the UE |
| Cell update cause | MP | | Cell update cause 10.3.3.3 | |
| Failure cause | OP | | Failure cause and error information 10.3.3.14 | |
| RB timer indicator | MP | | RB timer indicator 10.3.3.28 | |
| Mu Power control ind. | OP | | | Identifies requested power level for multicast services |
| Mu-UE identity | OP | | | Identifies certain multicast subscriber |
| Multicast group/service identity | OP | | | Identifies certain multicast group or service |
| **Measurement information elements** | | | | |
| Measured results on RACH | OP | | Measured results on RACH 10.3.7.45 | |

RRC (25.331) changes

| Condition | Explanation |
|---|---|
| *Failure* | This IE is mandatory present if the IE "Failure cause" is present and not needed otherwise. |

FIG. 7

| Information Element/Group name | Need | Multi | Type and reference | Semantics description |
|---|---|---|---|---|
| Message Type | MP | | Message Type | |
| **UE information elements** | | | | |
| U-RNTI | MP | | U-RNTI 10.3.3.47 | |
| RRC transaction identifier | CV-*ProtErr* | | RRC transaction identifier 10.3.3.36 | |
| Integrity check info | CH | | Integrity check info 10.3.3.16 | |
| URA update cause | MP | | URA update cause 10.3.3.46 | |
| Protocol error indicator | MD | | Protocol error indicator 10.3.3.27 | Default value is FALSE |
| Mu Power control ind. | OP | | | Identifies requested power level for multicast services |
| Mu-UE identity | OP | | | Identifies certain multicast subscriber |
| Multicast group/service identity | OP | | | Identifies certain multicast group or service |
| **Other information elements** | | | | |
| Protocol error information | CV-*ProtErr* | | Protocol error information 10.3.8.12 | |

| Condition | Explanation |
|---|---|
| *ProtErr* | The IE is mandatory present if the IE "Protocol error indicator" has the value "TRUE" and not needed otherwise. |

RRC(25.331) changes

FIG. 8

| Information Element/Group name | Need | Multi | Type and reference | Semantics description |
|---|---|---|---|---|
| Message Type | MP | | Message Type | |
| UE information elements | | | | |
| Mu-UE identity | MP | | | Identifies certain multicast subscriber |
| Multicast group/service identity | MP | | | Identifies certain multicast group or service |
| Mu Power control ind. | OP | | | Identifies requested power level for multicast services |

RRC(25.331) changes

FIG. 9

| Information Element/Group name | Need | Multi | Type and reference | Semantics description |
|---|---|---|---|---|
| Message Type | MP | | Message Type | |
| **UE information elements** | | | | |
| Integrity check info | CH | | Integrity check info 10.3.3.16 | Integrity check info is included if integrity protection is applied |
| **CN information elements** | | | | |
| CN domain identity | MP | | CN domain identity 10.3.1.1 | |
| NAS message | MP | | NAS message 10.3.1.8 | |
| Mu-UE identity | OP | | | Identifies certain multicast subscriber |
| Multicast group/service identity | OP | | | Identifies certain multicast group or service |
| Mu Power control ind. | OP | | | Identifies requested power level for multicast services |
| Old multicast area identity | OP | | | To indicate the old multicast area. New RNC can used this identity to update the multicast status information in the old RNC. |
| **Measurement information elements** | | | | |
| Measured results on RACH | OP | | Measured results on RACH 10.3.7.45 | |

RRC (25.331) changes

FIG. 10

ADAPTIVE POWER CONTROL FOR MULTICAST TRANSMISSION

BACKGROUND

1. Field of the Invention

The present invention is related to a method or apparatus providing a multicast transmission in a communications network. More particularly, the present invention is related to a method or apparatus controlling the power of a multicast transmission in a wireless communications network.

2. Discussion of the Related Art

3GPP TS 23.041 V4.1.0 (2001-06) describes a Cell Broadcast Service (CBS) for a wireless communications network according to the specifications of the 3rd Generation Partnership Project (www.3GPP.org) which is similar to Teletext service offered on television, in that it permits a number of general messages to be broadcast and received by all receivers within a particular region. These CBS messages are broadcast to defined geographical coverage areas also called cell broadcast areas. A cell broadcast area may comprises one or more cells, or may comprise the entire cellular network. Individual CBS messages are assigned their own cell broadcast area by a mutual agreement between the information provider and the network operator. They may originate from a number of different Cell Broadcast Entities (CBEs), which are connected to a Cell Broadcast Center (CBC). CBS messages are then sent from the CBC to the cells via a radio access network in accordance with the CBS's coverage requirements.

CBS has the disadvantage that the messages are broadcast indiscriminately to all receivers within the geographical coverage area. It cannot identify different UEs for comprising a multicast group or make evaluations between different cells (e.g., the number of UEs in a cell, etc, etc.) or between different sessions (e.g. delay requirements for transmission, session priority, etc.)

3GPP TS 22.146 V2.0.0 (2001-09) describes, at a high level, the requirements desired for an envisioned multicast service. Unlike CBS, the multicast service uses common network resources to provide data communications only to a restricted group of people in one or more cells of the network who previously indicated their interest to receive the multicast service.

The intent is to enhance the current capabilities of the Universal Terrestrial Radio Access Network (UTRAN) and the Core Network (CN) to make them become capable of providing the envisioned multicast service. For example, the core network which knows only the Location/Routing area level of the UEs of a plurality of service subscribers will forward the data to be multicast to the UTRAN. The UTRAN, which knows the various cell locations of the UEs, in turn transmits the data to each of the UEs in a cell through one common physical channel on the radio interface. The transmissions of the multicast data in the various cells may be simultaneous or may be scheduled. Possible physical channels could be, for example, the Secondary Common Control Physical Channel (SCCPCH) which is currently used to transmit data of the transport channel and the Fast Access Channel (FACH) which can transmit CBS data as well as other types of data.

The power level used for the transmission of a common physical channel (for example, open loop power control) is typically defined based on cell structure and the conditions of the air interface (i.e., as defined by the radio access network) without checking the conditions in the cell from the UE point of view or the locations of the UEs. It is typically fixed and set high enough so that the UE furthest from the base station and almost at the border of the cell is able to receive the transmission. This has the disadvantage that the power level is unnecessarily high for most of the UEs. From the air interface point of view, it also results in interference which could be avoided if the radio access network had information about authorised UEs in the cell.

Location information at least from URA (UTRAN Registration Area) level can usually only be fetched from a Radio Network Controller (RNC) if the authorized UEs and the UEs are in a Radio Resource Controller (RRC) connected state. However, it is more than likely that the most of the UEs are in IDLE mode and have no RRC connection. Therefore their precise location is unknown to the radio access network and the power level of the multicast data transmission cannot be controlled accordingly. In order to transmit the multicast data more efficiently, the radio access network should know the condition in the cell from the UE point of view and the locations of the authorized UEs, such as whether there are any UEs in a cell upon activation of the multicast data transmission, and adaptively control the power level accordingly before transmitting the data. Thus, there is a need for a system or apparatus for allowing the RNC to keep a record of the location of the UEs in the cells even though they are in the IDLE mode.

BRIEF SUMMARY

In the preferred embodiments of the invention, a radio access network defines the power level used for data transmissions in a multicast service based on information received from UEs authorized to receive those multicast services. The UEs can be authorized, for example, by the subscriber (i.e., an owner of a Subscriber Identification Module card) making a service subscription in advance with a service provider. Preferably, but not necessarily, this information necessary for controlling the power level is provided without establishing any dedicated uplink feedback channels before or during the transmission of the multicast data in a session. The power level used can be less than the maximum level which would otherwise be used to transmit multicast data on one common physical channel.

One object of the preferred embodiments is to include radio interference measurements in a UE when the UE is already active and to use such procedures between UE and the network, which are already available for purposes other than power level control or which do not require any hard signalling exchange transactions in order to transmit required information from the UE to the network. The embodiments do not limit the details of the measurements performed by the UE or the types of signals or values produced by the measurements and calculations.

BRIEF DESCRIPTION OF THE DRAWINGS

FIG. 7 is an example of a CELL UPDATE message in a preferred embodiment of the invention.

FIG. 8 is an example of the URA UPDATE message in a preferred embodiment of the invention.

FIG. 9 illustrates the structure of a MULTICAST POWER INDICATION message in a preferred embodiment of the invention.

FIG. 10 illustrates the UPLINK DIRECT TRANSFER message in a preferred embodiment of the invention.

DESCRIPTION OF THE PREFERRED EMBODIMENTS

Figures 1, 6:
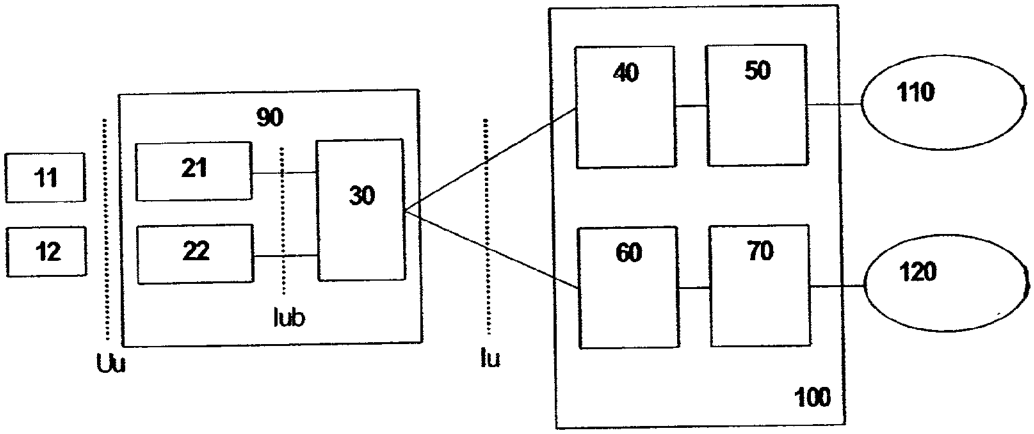
FIG. 1 is a schematic block diagram indicating a network architecture in which the preferred embodiments of the invention can be implemented.
FIG. 6 is an example of the register storing power level information for UEs in a UTRAN according to a preferred embodiment of the invention.

The particulars shown herein are by way of example and for purposes of illustrative discussion of the preferred embodiments of the present invention. The description taken with the drawings make it apparent to those skilled in the art how other various embodiments of the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions Although the preferred embodiments of the present invention may be described using an example system block diagram in a 3G wireless communication network compatible or backward compatible with the specifications promulgated by the 3$^{rd}$ Generation Partnership Project, practice of the invention is not limited thereto, i.e., the invention may be able to be practiced with other types of wireless communication networks, and in other types of environments.

Reference in the specification to "the preferred embodiment" or "an embodiment" means that a particular feature, structure, or characteristic described in connection with the embodiment is included in at least one embodiment of the invention. The appearances of the phrase "the preferred embodiment" in various places in the specification are not necessarily all referring to the same embodiment.

The present invention is related to methods and systems for location registration and management of UEs in a UTRAN authorized to receive a multicast service announcement in a cell where a network continuously indicates the status of the multicast service situation to the cell. This makes joining the multicast service much easier from a UE point of view. The present invention is also related to methods and systems for a multicast service announcement in a cell where networks indicate when the network is about to start the next multicast session in order to allow UEs to wake up on the correct moment. User equipment (UE) according to the present invention may be a mobile network node (e.g., a mobile phone, Personal Data Assistant (PDA), or laptop computer) or non-mobile network node.

The preferred embodiments of the invention will be described with reference to the basic network architecture comprising a UTRAN 90 and a CN 100 shown in FIG. 1. First and second UE 11, 12 are connected via the Uu radio interface to respective first node B 21 and second node B 22 of UTRAN 90. First node B 21 and second node B 22 participate in the same radio resource management and have the same function as a generic base station. Furthermore, the UTRAN 90 comprises at least one Radio Network Controller (RNC) 30, which is connected to first node B 21 and second node B 22 via the lub interface and is responsible for the control of the radio resources in its domain, i.e. first node B 21 and second node B 22. RNC 30 is the service access point for all services the UTRAN 90 provides to the CN 100.

CN 100 comprises a Mobile Switching Centre/Visitor Location Register (MSC/VLR) 40 which is a switch (MSC) and database (VLR) that conventionally serves an UE for circuit switched (CS) services. The MSC function is used to switch the CS transactions, and the VLR function holds a copy of the visiting user's service profile, as well as information on the UE's location within the serving system. The part of the network which is accessed via the MSC/VLR 40 is often referred to as CS domain. The MSC/VLR 40 is connected to a Gateway MSC (GMSC) 50 which is a switch at the point where the CN 100 is connected to external CS networks 110, e.g. Public Switched Telephone Networks (PSTNs), Integrated Services Digital Networks (ISDNs) or Public Land Mobile Networks (PLMNs). All incoming and outgoing CS connections go through the GMSC 50.

Furthermore, CN 100 comprises a Serving GPRS (General Packet Radio Services) Support Node (SGSN) 60 having a function similar to the MSC/VLR 40 but typically used for packet switched (PS) services. The part of the network accessed via the SGSN 60 is often referred to as the PS domain. The SGSN 60 is connected to a gateway GPRS Support Node (GGSN) 70 having a functionality similar to the GMSC 50 but for PS services. The GGSN 70 is thus a switch at the point where the CN 100 is connected to external PS networks 120, such as the Internet.

MSC/VLR 40 and the SGSN 60 are connected to the RNC 30 via the Iu-interface which thus connects the UTRAN 90 to the CN 100. The Iu-interface is preferably an open standards interface which handles switching, routing and service control.

To achieve a multicast transmission function between the CN 100 and the UTRAN 90 via the Iu-interface, different characteristics of the multicast related data transmission need to be taken into account not only upon the active data transmission, but also upon reservation and configuration of the required resources from Iu-interface. For these different phases, 3GPP TS 25.331 V3.9.0 (2001-12) defines signaling protocols such as RANAP (Radio Access Network Application Part) and IuUP (Iu Interface User Plane Protocol). RANAP is a signaling protocol in the Iu-interface that contains all control information specified for the Radio Network Layer used for UTRAN-related issues. The IuUP also belongs to the Radio Network Layer and is independent of the CN domain that it is used for as much as possible. The purpose of the IuUP is to carry user data related to Radio Access Bearers (RABs) over the Iu-interface. Each RAB has its own instance of the protocol. The protocol performs either a fully transparent operation, or framing for user data segments and some basic control signaling to be used for initialisation and online control. Based on these cases, the luUP has two modes, i.e. a transparent mode for fully transparent operation and a support mode for predefined SDU (Service Data Unit) sizes corresponding to framed user data segments. Only upon the support mode, control procedures are specified.

Thus, the Iu UP is the only protocol in the above group, which is capable of transmitting not only control information but also user plane data (i.e. in this case multicast related data) and therefore it is a candidate for the user plane data transmission and the transmission of connection related control information over the Iu-interface. RANAP can be used for transmission of control information and therefore they are not directly available for multicast data transmission. The RANAP messages can be used to configure and reserve resources from the Iu-interface for the multicast session.

Figure 2:
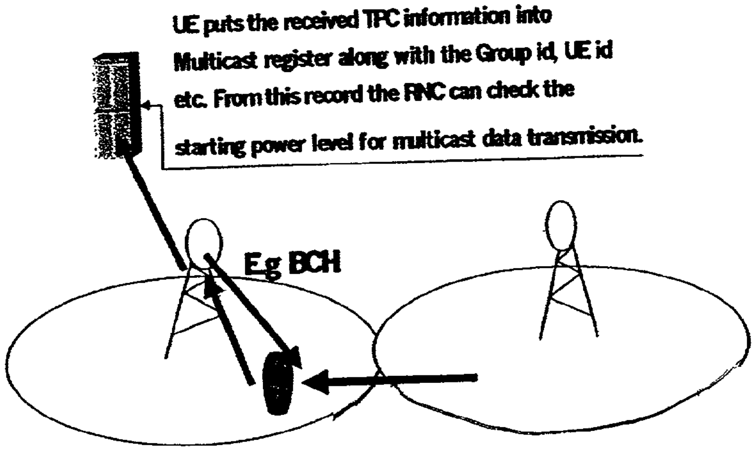
FIG. 2 illustrates a transaction performed when a UE enters a new cell according to a preferred embodiment of the invention.
Figure 3:
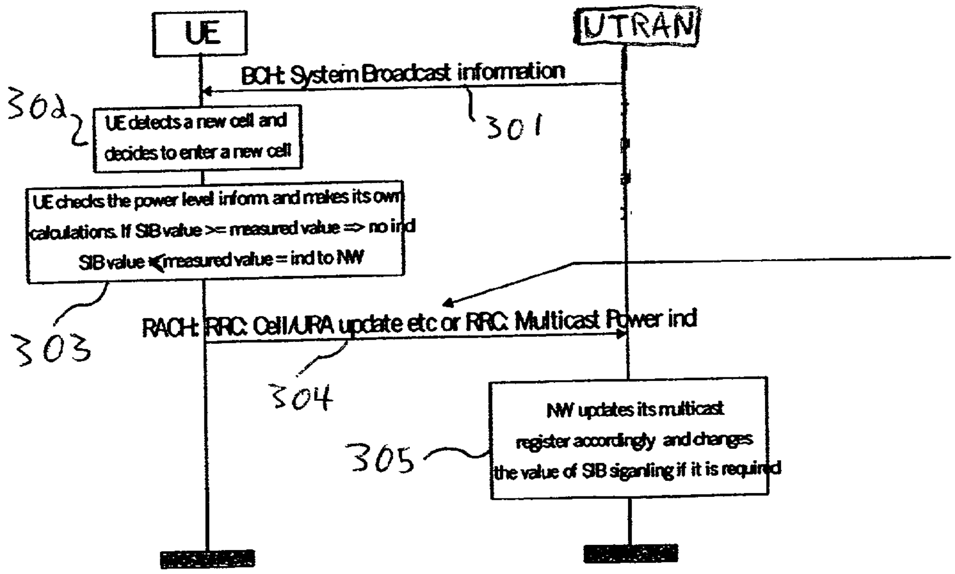
FIG. 3 is a flow diagram indicating the operations performed when the UE enters a new cell according to a preferred embodiment of the invention.

The operations which are performed in UE 11 or 12 according to a preferred embodiment of the invention are illustrated in FIGS. 2–5. In general, UE 11 or 12 receives system broadcast information (i.e., SIB signalling messages) in the BCH transport channel mapped into a Primary Common Control Physical Channel (PCCPCH) (301 in FIG. 3) in the cells of a wireless communication network. When it enters a new cell as shown in FIG. 2 and 302 in FIG. 3, it generally performs any number of possible area update procedures (cell/URA/LA/RA/multicast, etc.). At this time, it checks the power level used for the multicast sessions in the cell. It does this by measuring the air interface based on information (e.g, the Eb/No, ELER, BER or other TPC value) in a received downlink channel (i.e., system broadcast information in the Broadcast Channel (BCH)/PCCPCH as shown in FIGS. 2 and 3, or SCCPCH which typically contains paging messages or FACH, etc.) These measurements and possible calculations produce a power level value. This power level value can be compared to the values received in SIB signalling messages. Depending on the results obtained from the comparison, UE 11 or 12 may or may not send an indication to UTRAN 90. For example, if the comparison indicates that the measured value is less than the values received in the SIB signaling messages, then UE 11 or 12 may send an indication to UTRAN 90. (303 in FIG. 3)

Whether UE 11 or 12 sends a power level measurement indication may be based on any number or combination of factors in addition to the simple logical comparison of the relative values described in the previous paragraph. For example, it could depend on how small the difference is between the measured value and power value received in the SIB signalling messages or whether the value exceeds the "absolute highest power level" indicated in the SIB signalling messages. It could depend on the priorities of the multicast services which it is capable of receiving. It could also depend on the type of multicast service it is capable of receiving (e.g., a multicast service tied to a certain place such as a mall or sports arena. There may be a plurality of different power level measurement indication types corresponding to the various combination of factors.

If UE 11 or 12 decides to send information on the measured power level in order to control the power level, that information can be included and sent in a conventional message, such as a RRC Cell Update message, a RRC URA Update message or a RRC LA Update message. Alternatively, the information may be included in a RRC Multicast Area Update message or a RRC Multicast Power Indication message, as hereafter described. (304 in FIG. 3) Preferably, UE 11 or 12 decides which message type is used. Also, if for some reason no update procedure is performed when UE 11 or 12 enters the new cell, UE 11 or 12 preferably decides whether or not to send a message.

If UE 11 or 12 sends a message to UTRAN 90, the information included in the message is put into a multicast register accordingly along with identifying information, such as Group ID, UE ID, etc (305 in FIG. 3). If information for UE 11 or 12 is already stored in the multicast register, then the register is updated with the new information. From this record, RNC 30 can check the starting power level for multicast data transmissions. It can also change the value of SIB signalling if required.

Figure 4:
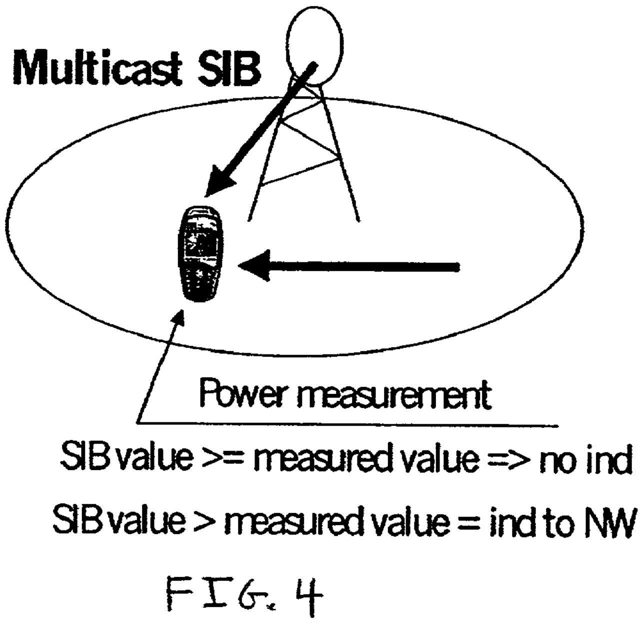
FIG. 4 illustrated the transactions performed for a UE when the UE moves within a cell according to a preferred embodiment of the invention.
Figure 5:
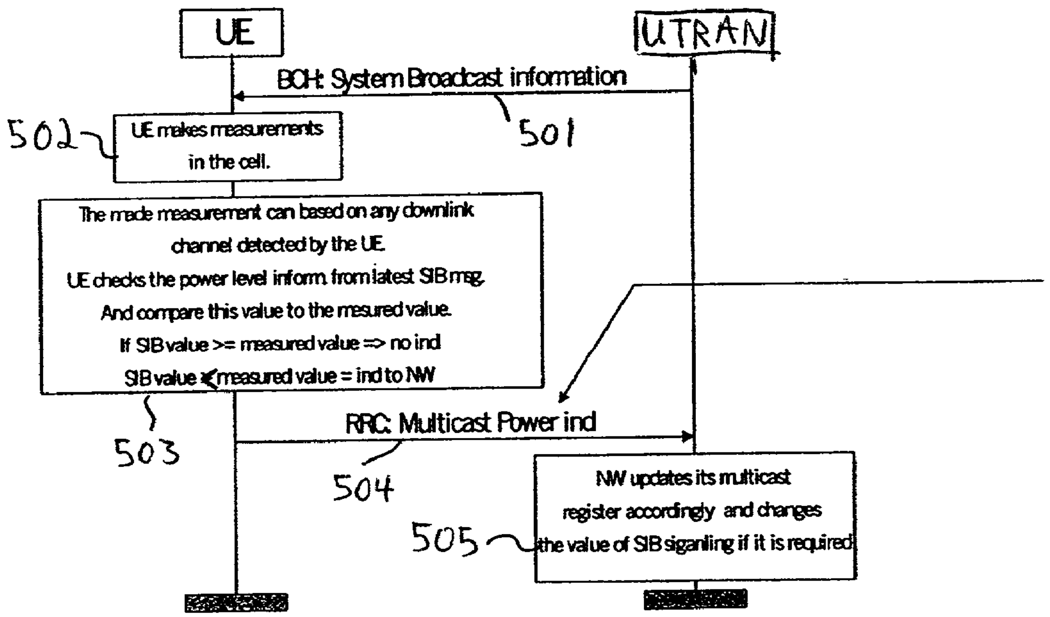
FIG. 5 is a flow diagram indicating the operations performed for an UE when it is moving inside a cell according to a preferred embodiment of the invention.

FIGS. 4 and 5 show the operations performed when UE 11 or 12 moves inside a cell. If UE 11 or 12 is in idle mode, it preferably measures the power level from time to time to check the possibility of performing the cell reselection procedure (502 in FIG. 5). At the same time, UE 11 or 12 can also make measurements for power control purposes. Just as described above with respect to FIGS. 2 and 3, the measurements can be based on any downlink channel received by UE 11 or 12; the power level value can be checked from information in the latest SIB messages and this value can be compared to the measured value (503 in FIG. 5). If UE 11 or 12 has moved to a place in the cell where the indicated power level is not enough, it may send a RRC Multicast Power Indication Message as described below (504 in FIG. 5) to UTRNA 90. Preferably, UE 11 or 12 can decide whether to send a message or not. The message can be transmitted on PRACH. Preferably, transmission of the message doesn't cause the establishment of an RRC connection. The mode of the RLC layer in these circumstances should be the transparent mode and can use logical channel CCCH.

If UE 11 or 12 sends a message to UTRAN 90, the information included in the message is put into a multicast register accordingly along with identifying information, such as Group ID, UE ID, etc (505 in FIG. 5). If information for UE 11 or 12 is already stored in the multicast register, then the register is updated with the new information. From this record, RNC 30 can check the starting power level for multicast data transmissions. It can also change the value of SIB signalling if required.

If UE 11 or 12 sees that the power level to be multicast on the cell is more than adequate for it, no power level information is sent to UTRAN 90. Also a relatively small difference between the received power level information and measured power level can be handled so that no indication is sent to the UE.

UE 11 or 12 can check the power level periodically based on, for example, timers supported in UE or IDLE mode measurement periods, etc. In general, it is desired that UE 11 or 12 is not unnecessarily shifted from IDLE mode to make power level measurements, but instead makes the measurements when it has other reasons to be active.

UTRAN 90 has to keep a record of the locations of the UEs authorized to receive the multicast service. This location management can be carried out as described in U.S. Provisional Application No. 60/332,506 filed on Nov. 26, 2001, the disclosure of which is hereby incorporated by reference in its entirety. As described above, when UTRAN 90 receives power control information from UE 11 or 12, a record of UE 11 or 12 is created in a multicast database if it was previously unknown in the database and is updated if it was previously known. The record of power control information associated with UE 11 or 12 in the multicast database is preferably deleted at the same time other information associated with UE 11 or 12 is deleted from other databases in UTRAN 90.

An example of a register containing power level information and UE location information in a multicast database is shown in FIG. 6. If the power control information received from UE 11 or 12 indicate that a change of the power level (either increased or decreased) is warranted, UTRAN 90 can either the change the value in an SIB signalling message or wait until some predefined number of UEs also indicate the change (increase or decrease) in the power level. The method used to indicate power level may affect this process of whether UTRAN 90 changes the value in a SIB signalling message or not.

UTRAN 90 preferably uses the power level indicated in SIB signalling messages. If during an active session, RNC 30 gets an indication (as described below) that the UE 11 or 12 which requested the power level has left the cell, then the power level can be decreased (if desired) during the active session with small steps. However, this should preferably be done until: 1) UTRAN 90 receives a new indication for the power level from one of the other authorised UEs in the cell (for this session); 2) the next highest power level is reached; or 3) the allowed number of power level reductions has been made for the session. The power level may also be periodically decreased in small steps whenever there is an absence of power level measurement indications to ensure that the power level doesn't become higher than necessary. The power level could become higher than necessary if, for example, all UE's moved closer to cell center. These are just examples, and the RNC may also be set to decrease the power level in small steps in other circumstances. If a multicast service is only for a specified place, UTRAN 90 preferably shall use a fixed power level defined by a network and all UE based power level information shall be ignored.

As mentioned above, a new RRC Multicast Power Indication message can be used when UE 11 or 12 needs to transmit a new power level indication to UTRAN 90. The UEs, which are in IDLE mode, cell_PCH and URA_PCH state can transmit such a message by using the PRACH physical channel, RACH transport channel and/or CCCH logical channel (i.e., the RLC mode used is transparent mode).

The UEs, which are in Cell_FACH state, can also send the RRC Multicast Power Indication message through PRACH/RACH by using DCCH logical channel The timing of these messages can be varied as desired. For example, a restriction can be set so that a message is sent to UTRAN 90 only once per measurement period.

The UEs, which are in Cell_DCH state, may or may not be allowed to send any power level indication to UTRAN 90 because UTRAN 90 can use power level information which has already been defined for the dedicated channels.

FIGS. 7, 8 and 10 present examples of the modifications which may be made to three currently existing RRC messages according to a preferred embodiment of the invention—the Cell Update message, the URA update message and the Uplink Direct Transfer message, respectively. An example of the structure which may be used for the new RRC Multicast Power Indication message is provided in FIG. 9. The references in the tables are to the numbered sections in 3GPP TS 25.331.

The SIB signalling messages preferably contain information fields for at least the "highest power level" (based on UE measurements) and the absolute highest power level accepted for a particular cell as defined by UTRAN 90. The "highest power level" indicates the power level currently defined for multicast sessions based on information received from authorised UEs. This field can be a binary field, in which case a "1" or "0" may be set to indicate that each multicast service, which is supported in a particular cell, is going to use the highest power level on the radio interface. Alternatively, the value of this field can be based on the number of multicast services (i.e., each multicast service could have a power level of its own); the priorities of the multicast services; the number of multicast services which are linked with a location+rest of the services or any combination thereof. (For example, football clips may have one value because the multicast service for it is available in a football stadium only and therefore the power level can be optimised based on the location of the football stadium.)

The second field for "absolute highest power level" indicates the power level, which is defined by the network operator and follows the condition of the air interface generally. The value in this field is the absolute maximum value for the multicast data transmission and no new information from an UE can change the value. The value in this field in SIB message can based on the same principles described above for the first field.

As mentioned above, the user equipment may include power level information in a Multicast Area Update message. This message is used to transmit multicast related information when the user equipment is in IDLE, Cell_PCH and URA_PCH state. The size of this message cannot exceed the maximum size of one PRACH radio frame.

It is noted that the foregoing preferred embodiments have been provided merely for the purpose of explanation and are in no way to be construed as limiting of the present invention. While the present invention has been described with reference to preferred embodiments, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods and embodiments, the present invention is not intended to be limited to the particulars disclosed herein, rather, the present invention extends to all functionally equivalent structures, methods and uses, such as other types of wireless communication networks.

What is claimed is:

1. A method of controlling the power level of multicast data transmissions in a wireless communications network, comprising:

providing power level information in a transmitted channel received by a user equipment;

measuring the power level of a signal received by said user equipment;

comparing the power level measured by the user equipment to the power level indicated by said power level information provided in said transmitted channel;

including power level measurement information in a message sent by said user equipment depending on the results obtained when the power level measured by said user equipment is compared to the power level indicated by said power level information provided in said transmitted channel; and controlling the power level of said multicast data transmissions based on said message.

2. A method according to claim 1, wherein the method is carried out when the user equipment enters a new cell.

3. A method according to claim 1, wherein said comparing step is performed in said user equipment and said power level measurement information is included in said message sent by said user equipment if the power level measured by said user equipment is less than the power level indicated by said power level information provided in said transmitted channel.

4. A method according to claim 3, wherein the message sent by said user equipment if the power level measured by said user equipment is less than the power level indicated by said power level information provided in said transmitted channel is a Cell Update message.

5. A method according to claim 3, wherein the message sent by said user equipment if the power level measured by said user equipment is less than the power level indicated by said power level information provided in said transmitted channel is a URA Update message.

6. A method according to claim 3, wherein the message sent by said user equipment if the power level measured by said user equipment is less than the power level indicated by said power level information provided in said transmitted channel is an Uplink Direct Transfer message.

7. A method according to claim 3, wherein the message sent by said user equipment if the power level measured by said user equipment is less than the power level indicated by said power level information provided in said transmitted channel is an Multicast Power Indication message.

8. A method according to claim 3, wherein said user equipment decides what type of message to send if the power level measured by said user equipment is less than the power level indicated by said power level information provided in said transmitted channel.

9. A method according to claim 1, wherein the method is performed periodically while said user equipment is in the same cell.

10. A method according to claim 1, further comprising storing in a multicast database said power level measurement information included in said message sent by said user equipment.

11. A method according to claim 1, wherein said message sent by said user equipment does not cause the establishment of an RRC connection.

12. A method according to claim 1, wherein said wireless communication network changes the power level of multicast data transmissions based on the power level measurement information included in a message sent by said user equipment.

13. A method according to claim 12, wherein the power level of said multicast data transmissions is less than the maximum power level required for all user equipments in the wireless communication network.

14. A method according to claim 12, further comprising tracking the location of user equipments in the wireless communication network.

15. A user equipment for receiving multicast data transmissions in a wireless communications network, said user equipment adapted to carry out a power level control method comprising:

receiving power level information in a transmitted channel;

measuring the power level of a first received multicast data transmission;

comparing the measured power level to the power level indicated by said power level information provided in said transmitted channel;

including power level measurement information in a message depending on the results obtained when the power level measured by said user equipment is compared to the power level indicated by said power level information provided in said transmitted channel; and receiving additional multicast data transmissions subsequent to said message, the power level of said subsequent multicast data transmissions being based on said message.

16. A user equipment according to claim 15, wherein the method is carried out when the user equipment enters new cell.

17. A user equipment according to claim 15, wherein the message sent by said user equipment is a Cell Update message.

18. A user equipment according to claim 15, wherein the message sent by said user equipment is a URA Update message.

19. A user equipment according to claim 15, wherein the message sent by said user equipment is an Uplink Direct Transfer message.

20. A user equipment according to claim 15, wherein the message sent by said user equipment is an Multicast Power Indication message.

21. A user equipment according to claim 15, wherein said user equipment decides what type of message to send if the measured power level is less than the power level indicated by said power level information provided in said transmitted channel.

22. A user equipment according to claim 15, wherein the method is performed periodically while said user equipment is in the same cell.

23. A network element in a wireless communication network, said network element performing a method comprising:

providing power level information in a downlink channel transmitted to user equipment in said wireless communication network;

receiving a message from user equipment, said message including power level measurement information indicating the results of a comparison of the power level measured by said user equipment to the power level indicated by said power level information provided in said transmitted channel; and controlling the power level of multicast data transmissions based on said message.

24. A network element according to claim 23, wherein said wireless communication network changes the power level of multicast data transmissions based on the power level measurement information included in a plurality of messages sent by a plurality of user equipment.

25. A network element according to claim 24, wherein said network element is adapted to receive a messages including power level measurement information indicating that the power level measured by said user equipment is less than the power level indicated by said power level information provided in said transmitted channel and to provide that said wireless communications network increases the power level of multicast data transmissions in response to said messages including said power level measurement information.

26. A network element according to claim 24, wherein said network element is adapted to receive messages including power level measurement information indicating that the power level measured by said user equipment is less than the power level indicated by said power level information provided in said transmitted channel and to provide that said wireless communications network decreases the power level of multicast data transmissions in the absence of said messages.

27. A network element according to claim 23, wherein the power level of said multicast data transmissions is less than the maximum power level required for all user equipments in the wireless communication network.

28. A network element according to claim 23, further comprising tracking the location of user equipments in the wireless communication network.

29. A network element according to claim 23, wherein said network element stores the power level measurement information included in a plurality of messages sent by a plurality of user equipment in a multicast database.

* * * * *